June 26, 1956  D. R. ROWLAND ET AL  2,751,765

PROPELLER SHAFT

Filed Nov. 16, 1953

INVENTORS
Dan R. Rowland &
BY Martin H. Stark

C. H. Sibbe
ATTORNEY

United States Patent Office 2,751,765
Patented June 26, 1956

2,751,765
PROPELLER SHAFT

Dan R. Rowland and Martin H. Stark, Saginaw, Mich., assignors to General Motors Corporation, Detroit, Mich., a corporation of Delaware Application November 16, 1953, Serial No. 392,216

4 Claims. (Cl. 64—1)

This invention relates to shafts or other such members for transmitting power from power plants to mechanisms for doing work and in its most particular aspect concerns tubular propeller shafts for automotive vehicles and the like.

Motor vehicle propeller shafts are subject to vibratory forces reflected as undesirable noise at certain critical speeds. The vibrations impressed on the shaft may be of the same or about the same frequency as the natural vibratory frequency of the shaft, as determined by the static deflection of the shaft, in which event the phenomenon of resonance becomes manifest; or they may be of higher or lower frequency, in which case their transmission through the propeller shaft may give rise to noise either in the rear axle or in some part of the mechanism ahead of the propeller shaft in the power train.

Vibration of a propeller shaft is an undesideratum not only by reason of the resultant noise, but also because the vibrations represent a loss of energy and hence a loss of horsepower. While considerable research and development work has been carried out with a view toward reducing the vibrations, the means proposed have been found to cause manufacturing complications, increasing costs out of proportion to the benefits obtained. Moreover, in a number of cases the dynamic balance of the shaft has been so affected that the shaft tends to whip at high speed, a highly unfavorable condition. Still other of the means suggested by the prior workers have been found to change the natural vibratory frequency of the shaft, necessitating redesigning of associated parts.

As indicated, the principal object of the present invention is to provide a propeller shaft of tubular construction which possesses a low transmissibility ratio and which therefore exhibits little, if any, tendency to pass vibrations manifested as noise.

A corollary object is to satisfy the foregoing object in an economic and expeditious manner.

A further object is to adequately damp a propeller shaft through resonance without substantially changing its natural frequency or upsetting its dynamic balance.

We shall particularly describe our invention with the aid of the accompanying drawings illustrating the same in its preferred embodiment and in which.

Figures 1, 2, 3:
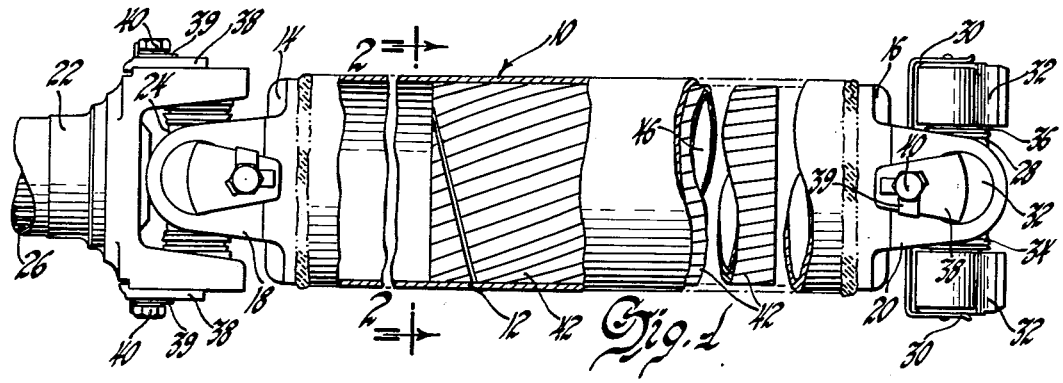
Figure 1 is a broken plan of the particular shaft, the same being shown partly in section and partly in elevation.
Figure 2 is a transverse section on the line 2—2 in Figure 1.
Figure 3 is a fragmentary detail.

From Figure 1 it will be observed that the shaft 10 consists of a hollow cylinder 12, closed at either end by a cap piece 14, 16 shown as affixed by welding. Each of the cap pieces includes as an integral part thereof a yoke 18, 20. Yoke 18 is joined to a front yoke member 22, internally splined at 26 to receive the transmission output shaft, not shown through a roller bearing trunnion or spider 24 of conventional design. A similar roller bearing trunnion 28, connected to the yoke 20, is employed to enable a universal connection with the differential companion flange, not shown.

A clip 30 serves simply to prevent loss of the rollers 32 engaged thereby, during storage and transit. The rollers 32 are spaced from the hub of the trunnion or spider by dust shields 36 and retainers 34, respectively. As the joint is of the well known "Saginaw" type, the rollers disposed in the arms of the yoke are held in place by a flat retainer plate 38 and a screw 40, a washer 39 being interposed between the screw and plate.

To damp out vibrations of the shaft 10, there is confined within the hollow cylinder 12 a multi-ply tubular cardboard liner 42, the outer ply 44 being corrugated so as to enable a press fit of the liner within the cylinder. The core 46 may, with advantage, be formed of about five plies, each of which, like the outer corrugated ply, may be spirally wound. Any suitable adhesive may be used to provide the bond between the plies.

For optimum results, the press fit should be such as to require a pressure of between about 70 and 350 pounds, derived as through the use of an hydraulic ram, for insertion of the liner, which should be fabricated to withstand the selected pressure without tearing or buckling. It is also important, for optimum results, that the liner be substantially co-extensive with the length of the cylinder. The corrugations at the leading end may be ironed down by any suitable means to facilitate insertion of the liner.

Having thus described and illustrated our invention, what we claim is:

1. A tubular propeller shaft for motor vehicles and the like having therein a paper liner serving to damp vibrations of the shaft in use, said liner being substantially co-extensive with the length of the shaft and having a corrugated exterior, the corrugations following a spiral path and enabling a press fit of the liner within the shaft.

2. A tubular propeller shaft for motor vehicles and the like having therein a multi-ply paper liner serving to damp out vibrations of the shaft in use, said liner being substantially co-extensive with the length of the shaft and having a spirally wound corrugated external ply enabling a press fit of the liner within the shaft.

3. A tubular propeller shaft for motor vehicles and the like having therein a paper liner of a length such as to effectively damp vibrations of the shaft in use, said liner comprising exterior corrugations and being press fitted into the shaft with distortion of the corrugations.

4. A tubular propeller shaft for motor vehicles and the like having therein a paper liner comprising exterior corrugations following a spiral path, said liner having a length such as to effectively damp vibrations of the shaft in use and being press fitted into the shaft with distortion of the corrugations.

References Cited in the file of this patent
UNITED STATES PATENTS

| | | |
|---|---|---|
| 726,894 | Ferres | May 5, 1903 |
| 934,758 | Rinner | Sept. 21, 1909 |
| 2,001,167 | Swennes | May 14, 1935 |
| 2,011,988 | Timian | Aug. 20, 1935 |
| 2,109,937 | Trbojevich | Mar. 1, 1938 |